United States Patent [19]

Linder et al.

[11] Patent Number: 5,056,477

[45] Date of Patent: Oct. 15, 1991

[54] APPARATUS FOR ADJUSTING A ROTATIONAL ANGULAR RELATIONSHIP BETWEEN A CAMSHAFT AND ITS DRIVE ELEMENT

[75] Inventors: Ernst Linder, Muehlacker; Helmut Rembold, Stuttgart, both of Fed. Rep. of Germany

[73] Assignee: Robert Bosch GmbH, Stuttgart, Fed. Rep. of Germany

[21] Appl. No.: 549,034

[22] Filed: Jul. 6, 1990

[30] Foreign Application Priority Data

Sep. 9, 1989 [DE] Fed. Rep. of Germany ....... 3930157

[51] Int. Cl.⁵ .............................................. F01L 1/34
[52] U.S. Cl. .............................. 123/90.17; 123/90.31
[58] Field of Search ................ 123/90.15, 90.17, 90.31

[56] References Cited

U.S. PATENT DOCUMENTS

| | | | |
|---|---|---|---|
| 4,627,825 | 12/1986 | Bruss et al. | 123/90.17 |
| 4,762,097 | 8/1988 | Baker | 123/90.17 |
| 4,858,572 | 8/1989 | Shirai et al. | 123/90.15 |
| 4,903,650 | 2/1990 | Ohlendorf et al. | 123/90.17 |
| 5,002,023 | 3/1991 | Butterfield et al. | 123/90.17 |

Primary Examiner—E. Rollins Cross
Assistant Examiner—Weilun Lo
Attorney, Agent, or Firm—Edwin E. Greigg; Ronald E. Greigg

[57] ABSTRACT

An apparatus for adjusting an angular rotational relationship of a camshaft, serving in particular to actuate gas exchange valves of an internal combustion engine, with respect to its drive element, which apparatus has two control motors acting counter to one another, the mutually corresponding movable walls of which are coupled to one another, wherein to reduce an expense for furnishing control fluid and generating pressure in this control fluid the work chambers of the control motors are on the one hand both connected via a respective check valve, to a control fluid pressure source and on the other hand can be made to communicate selectively with one another directly via a control valve or can be disconnected from one another via this valve, so that torque fluctuations of the camshaft are exploited for generating pressure in one of the work chambers at a time and the resultant pressure is exploited purposefully at certain times for adjustment with subsequent relocking of the work chambers.

24 Claims, 4 Drawing Sheets

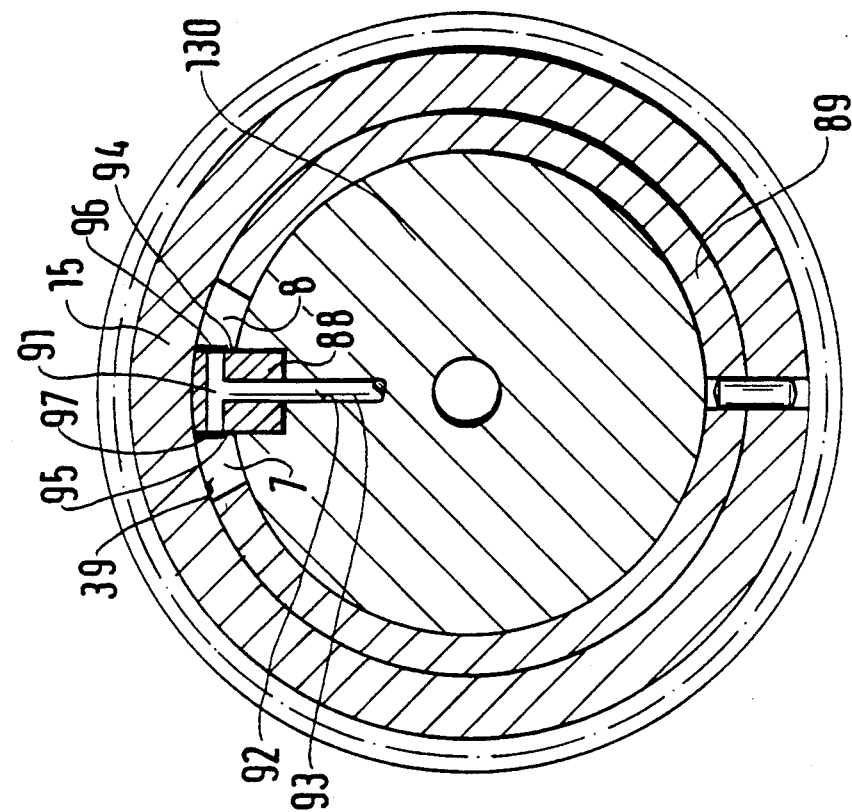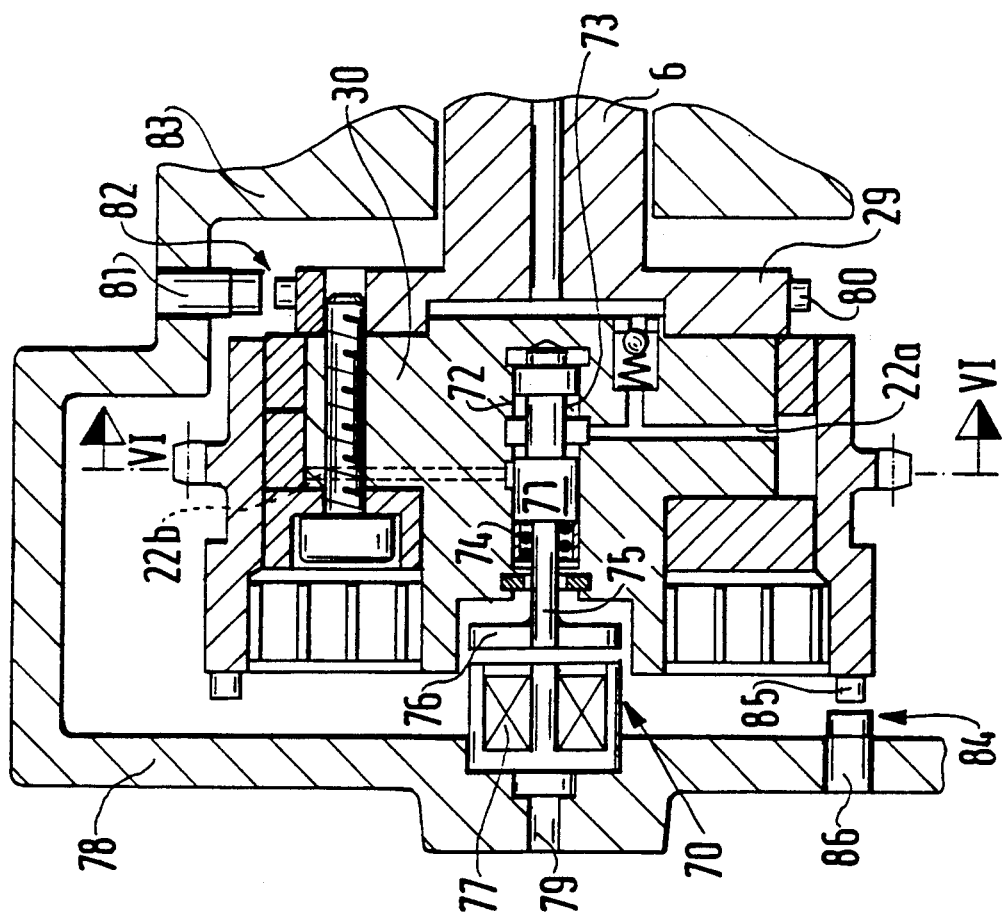

APPARATUS FOR ADJUSTING A ROTATIONAL ANGULAR RELATIONSHIP BETWEEN A CAMSHAFT AND ITS DRIVE ELEMENT

BACKGROUND OF THE INVENTION

The invention is based on an apparatus for adjusting a rotational angular relationship of a camshaft, as defined hereinafter. In an apparatus of this kind known from European Patent Document A 0 163 046, two hydraulic control motors, disposed on a diameter of a part connected to the camshaft and each having an adjusting piston that acts via a roller on a ramp, are provided, the rollers are disposed on a drive gear radially surrounding the part connected to the camshaft. The ramps associated with each control motor are inclined oppositely, so that upon an adjustment of the adjusting piston of one control motor, the camshaft is adjusted relative to the drive gear via the ramps such that the opposite ramp forces the adjusting piston of the other control motor backward. The control motors are triggered by valves or a slide valve such that pressure is exerted upon the piston of one control motor, which has been moved outward, while the work chamber of the other control motor opposite it is relieved, enabling the piston of that control motor to deflect along the ramp. This apparatus is relatively expensive because a separate pressure source must be furnished, along with two magnetic valves or one three-position valve for triggering the control motors. Although an existing oil pressure source in an internal combustion engine could be used as the pressure source, it runs at relatively low pressure. If this pressure source is needed to adjust the camshaft as well, then the pressure pump for bringing this pressure to bear must be larger than usual, because given the manner of triggering of the hydraulic control motors, a relatively large quantity of pressure oil is used. At the relatively low pressure, either the known apparatus operates only quite slowly or else very large control motors must be installed, which in turn use up a large quantity of pressure fluid and occupy a disadvantageously large amount of space. A separate high-pressure pump, on the other hand, is very expensive and consumes a large amount of energy.

OBJECT AND SUMMARY OF THE INVENTION

The apparatus according to the invention for adjusting the rotational angle relationship between a camshaft and its drive element, has an advantage of minimum pressure fluid consumption, because the pressure fluid structure specially designed for the apparatus, or even a separate high-pressure fluid source for the apparatus, is unnecessary. The apparatus also operates very fast and can be made quite small. Because the work chambers of the control motors are disconnected from the pressure fluid source via check valves, fluctuations in camshaft torque cause the buildup of pressure peaks in the work chambers, and these peaks each act opposite to the control direction in the work chambers. By means of the control valve, these pressure peaks can be exploited directly and intentionally as a pressure fluid source for adjustment purposes, by keeping the control valve opened or closed. Depending on which of the work chambers exhibits a pressure increase, a forward or backward adjustment of the relationship between the camshaft and the drive element can be performed.

Other advantageous features of the invention are disclosed. With a prestressing spring, the pressure is advantageously equalized in accordance with the mean drive torque of the camshaft. By disposing the work chambers diametrically opposite one another, a particularly space-saving embodiment with high torque is obtained. By triggering the control valve, various operating parameters of an internal combustion engine, in which the apparatus is for example used, can advantageously be taken into account. An advantageous embodiment of the apparatus with a space-saving disposition can be made very compact.

The invention will be better understood and further objects and advantages thereof will become more apparent from the ensuing detailed description of preferred embodiments taken in conjunction with the drawings.

BRIEF DESCRIPTION OF THE DRAWINGS

FIG. 5 shows a second exemplary embodiment of the invention with a modified control valve;

FIG. 6 shows a third exemplary embodiment in a section taken in the radial plane to the camshaft.

DESCRIPTION OF THE PREFERRED EMBODIMENTS

Figure 1:
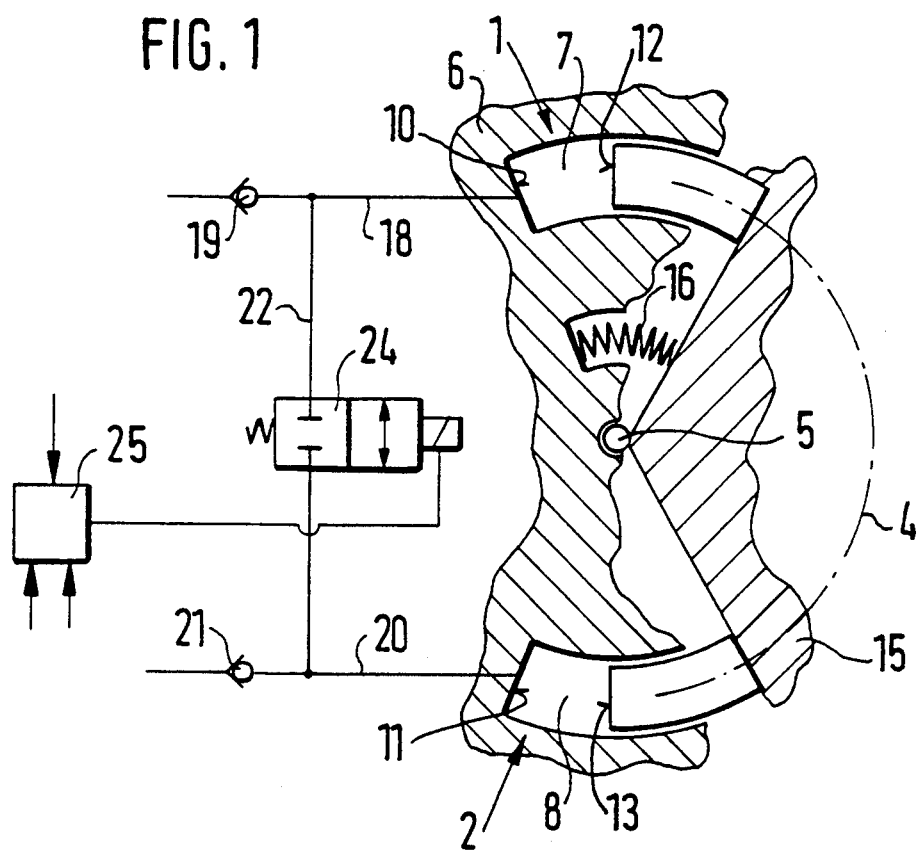
FIG. 1 is an illustration of the principle of the apparatus according to the invention, with diametrically opposed work chambers of the control motors.
Figure 2A:
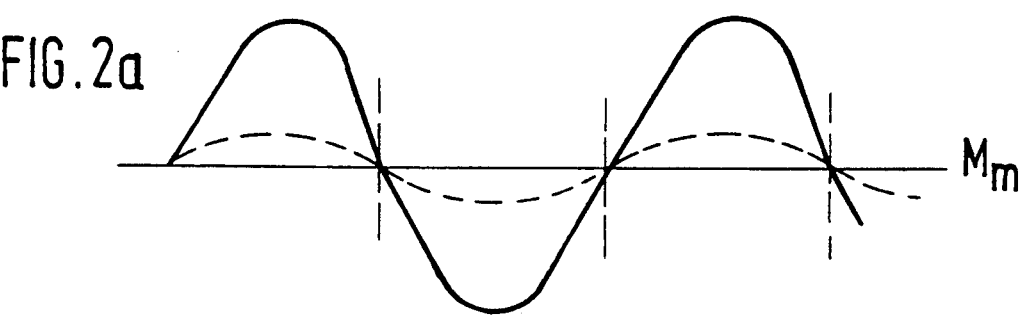
FIG. 2a shows the course of torque in a camshaft, which serves to drive gas exchange valves in an internal combustion engine at high and low rpm.
Figure 2B:
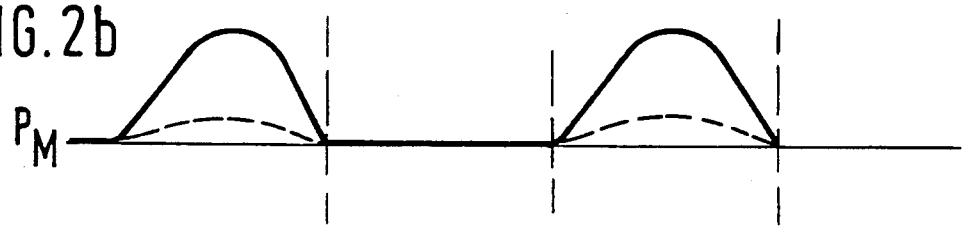
FIG. 2b shows the pressure courses associated with FIG. 2a over time in one of the work chambers of the control motors.
Figure 2C:
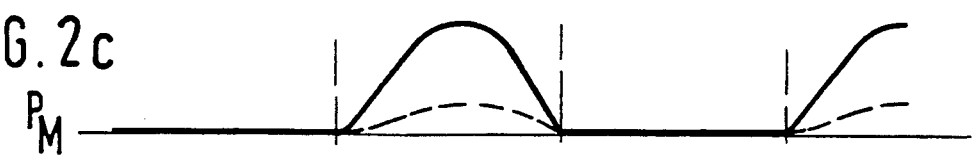
FIG. 2c shows the corresponding pressure course in the other of the work chambers of the two control motors.

In the diagram of FIG. 1, a first control motor 1 and a second control motor 2 are shown, the center axis 4 of which extends in the form of an orbit about the axis 5 of a camshaft 6, which is shown schematically and in intermittent portions. Each of the control motors has a work chamber 7 and 8, respectively, which is defined on one end of its length in the direction of the center axis or orbit by respective first movable walls 10 and 11, each of which is connected fixedly to the camshaft, opposite second movable walls 12 and 13, respectively, each of which is firmly connected to a drive element 15 of the camshaft. A prestressing spring 16 is operatively connected between the first movable walls 10 or 11 and the second movable walls 12 or 13 and is designed to urge the first movable wall 10 away from the second movable wall 12, in the direction of an enlargement of the work chamber 7 of the first control motor 1. A control pressure fluid line 18 also leads from the first work chamber 7 of the first control motor 1, via a one-way check valve 19 that opens in the direction of the work chamber, to a control pressure fluid pressure source, not shown. Analogously, a control pressure fluid line 20 also extends from the second control motor 2, from its second work chamber 8, via a one-way check valve 21, to the control pressure fluid pressure source. A connecting line 22 is connected between the control pressure lines 18 and 20, which connection is between the check valves 19 and 21 and the work chambers 7 and 8, respectively. A control valve 24, embodied as a 2/2-way magnetic valve, is inserted in the connecting line 22 and either makes or breaks the communication between the first work chamber 7 and the second work chamber 8. In the latter case, the volumes are locked within the work chambers; in the first case, pressure fluid can escape from the first work chamber 7, for instance, and overflow to the second work chamber 8. Given the rigid connection that the first movable walls 10 and 11 have with one another and that the second movable walls 12 and 13 have with one another, the volume of the first work chamber 7 is reduced by the amount by which the volume of the second work chamber 8 is increased. In this case, in the example shown, the drive element moves counterclockwise relative to the camshaft 6. If the control valve is closed and if the drive is effected on the part of the drive element 15, then the camshafts are driven in phase via the volumes, trapped in the work chambers 7 and 8, of the first control motor 1 and control motor 2, respectively. If the control valve is opened, however, then the phase relationship between the camshaft 6 and the drive element 15 can be varied by means of a relative motion. Such variations in the phase position of the camshaft, which serve to drive gas exchange valves, are required in order to enable changing control times of the gas exchange valves. Upon variation of the valve control times as a function of the rpm, the torque in an internal combustion engine in the lower rpm range can be increased up to 15%, because the combustion chambers are better filled. The smoothness of engine operation and exhaust emissions are also favorably affected. The improvement in emissions is effected by means of control of the internal exhaust gas recirculation, in which a partial quantity of exhaust gas, which can be controlled by the valve control times, is recirculated in the combustion chamber directly via the outlet valve and then the inlet valve. To vary the phase relationship of the camshaft to its drive element, typically a drive gear, which is driven by the crankshaft of the associated engine, an intentional buildup of pressure in at least one of the control motors is necessary. In the apparatus according to the invention, no special high-pressure source for a control pressure medium is needed for this. The control pressure fluid lines 18 and 20 serve primarily to fill the work chambers 7 and 8 but are not used for imposing pressure on one end of them. This imposition of pressure is a product of the load on the camshaft by drive moments. As can be seen from FIG. 2a, the camshaft, as a result of the drive of the various gas exchange valves, is exposed to various resistances in rotation, so that different drive moments build up as a load. These drive moments are shown over time in FIG. 2a; the solid line represents the course of torque at high rpm, and the dashed line represents the course of torque at low rpm. The result is a mean drive moment $M_m$, which is virtually independent of the rpm. This varying load, which is also propagated to the drive element 15, now makes itself felt in the control motors 1 and 2 in such a way that pressure courses as shown in FIG. 2b arise in the first work chamber 7, for instance, of the first control motor 1. The prestressing spring is designed such that it transmits the mean drive moment in such a way that symmetrical conditions with respect to pressure fluctuations prevail in the respective work chambers 7 and 8. For example, with a camshaft rotating counterclockwise, the volume in the first work chamber 7 is compressed via the drive wheel at relatively high camshaft resistance, as is represented in FIG. 2b by the first pressure increase. In the second work chamber 8, contrarily, no pressure increase occurs, as can be seen from the curve in FIG. 2c. Here, with the control valve 24 blocked, pressure fluid can at most be withdrawn from the pressure source via the line 20 and the check valve 21, so that here the mean pressure $P_M$ of the pressure source is established. In the next phase of camshaft rotation, a pressure does then build up in the second work chamber 8 as a consequence of contrary resistances, while in the first work chamber 7, analogously to the process described above, the pressure then remains constant, as represented by the curve of FIG. 2b. Once again, the minimum pressure is limited to the value $P_M$. The result is alternating pressure increases in the work chambers 7 and 8.

As long as these work chambers are separated from one another by the control valve 24, slightly oscillating relative motions between the drive element 16 and the camshaft 6 can occur, at most to the extent of the compressibility of the control pressure fluid, but no definitive change in the phase relationship occurs. Only once the control valve 24 is opened, at an instant at which a pressure rise is occurring for instance in the first work chamber 7, can pressure fluid overflow from the first work chamber 7 into the second work chamber 8 and thus initiate a relative motion of the camshaft with respect to the drive wheel. Depending on the triggering, the pressure buildup will be exploited for such adjustments in the positive or the negative rotational direction, in accordance with the moment course shown in FIG. 2a; the control valve 24 is opened purposefully in these ranges of the pressure rise. By means of angle encoders on both parts, that is, the drive element 15 and the camshaft 6, the purposeful variation in the phase relationship can be measured and fed to a control device 25, which compares the phase relationship signal with a set-point value suitably predetermined and ascertained from operating parameters and opens the control valve 24 at the desired times, in order to attain the set-point value.

Figures 3, 4:
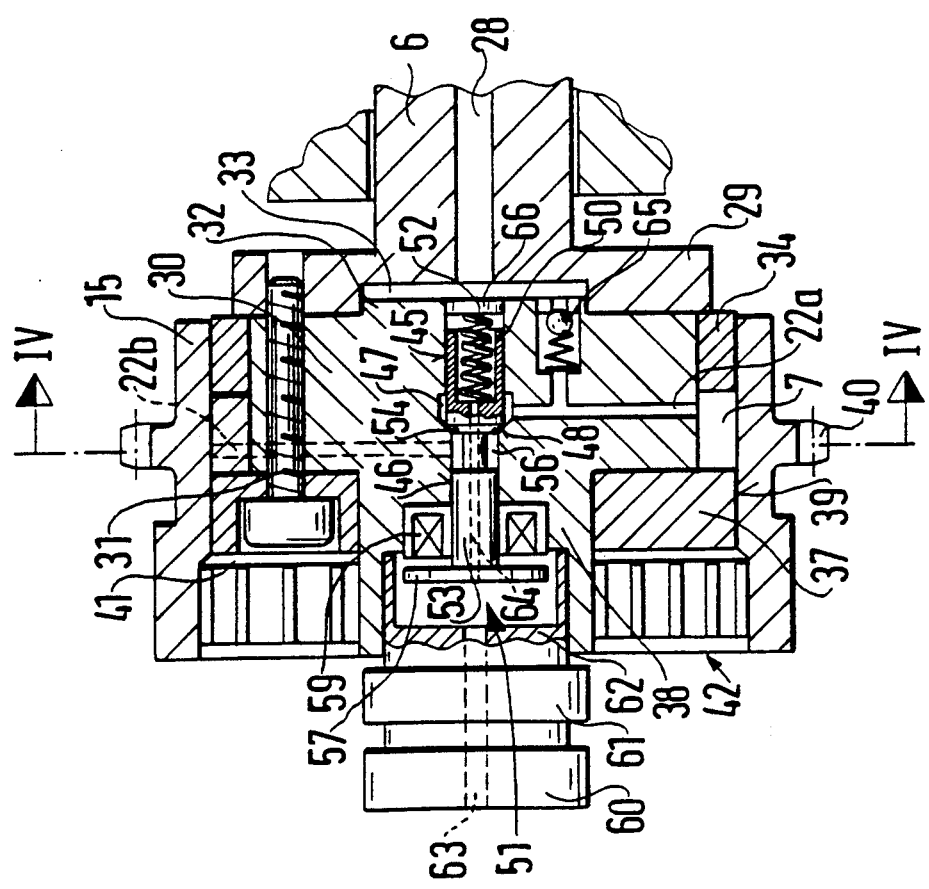
FIG. 3 shows a first exemplary embodiment of the invention on the principle of FIG. 1.
FIG. 4 is a section taken along the line IV—IV of FIG. 3.

FIGS. 3 and 4 show a more detailed version of the apparatus according to the invention, analogously to the operating principle of FIG. 1. FIG. 3 is a section through the end of the camshaft 6, in which an axial pressure fluid line 28 is provided, which for example originates in the pressure oil supply device of the associated engine and terminates at the face-end region of an end flange 29 of the camshaft 6. A holder part 30 is secured with screws 31 on the face end of the end flange 29 and on the side toward the camshaft and by means of a collar 32 dips partway into a corresponding recess 33 on the face end of the camshaft and is centered. The holder part 30 is cylindrical and has an annular closure element 34 on its circumference that comes axially into contact with the end flange. Adjoining it are two opposed split rings in the form of a first and second circular segment shell 35 and 36, mounted firmly on the jacket face of the holder part, and they in turn, extending axially, are laterally defined by a second annular closure element 37. This element is mounted on a stub 38 of reduced diameter of the holder part 30 and is pressed axially onto the holder part by the screws 31 and in this way retained on it. The first annular closure element 34, the first and the second circular segment 35 and 36, and the second annular closure element 34 sealingly surround the inner jacket face 39 of the sleevelike drive element 15, which on its outer circumference has a gear ring 40. The drive element protrudes axially past the second annular closure element 37 and with the outer circumference of the stub 38 forms an annular recess 41, in which a spiral spring 42 is disposed, one end of which is firmly connected to the stub and the other end of which is connected to the drive element 15, so that it prestresses the drive element 15 relative to the holder part 30. As can be seen in further detail in FIG. 4, the first circular segment 35 and the second circular segment 36 enclose the first and second work chambers 7 and 8, respectively, which here are approximately diametrically opposite one another and are tightly enclosed laterally by the closure elements 34 and 37 and radially by the holder 30 and the drive element 15. The first circular segment is firmly connected via a pin 43 to the holder part 30, and the second circular segment 36 is firmly connected to the drive element 15 via a pin 44. Upon clockwise rotation of the drive element 15, the volume of the first work chamber 7 thus increases, and the volume of the second work chamber 8 decreases by the amount of the enlargement of the first work chamber volume. This is on the condition that the connecting line, which extends diametrically through the holder part from one work chamber to the other, is opened by the control valve 24 incorporated into this line. This is shown only symbolically in FIG. 4 but is shown in detail in FIG. 3. To realize the control valve, the holder part 30 has an axial stepped bore 45, 46; the stepped bore portion 45 oriented toward the camshaft has the larger diameter and the adjoining stepped bore portion 46 has the smaller diameter. The two portions of the stepped bore are separated from one another by a notch 47, on the transition region on which the valve seat 48 is also embodied. From the notch, a connecting line portion 22a leads to the first work chamber 7. In the stepped bore portion 45 having the large diameter, a valve closing element 50 of a magnetic valve 51 is tightly displaceably disposed, and is moved from the side of the camshaft by a restoring spring 52 toward the valve seat 48, on which it comes to rest with a conical sealing face at the transition to an adjoining piston guide portion 53, which is guided in the stepped bore portion 46 having the smaller diameter. Immediately adjacent to the sealing face, the piston guide portion 53 has an annular groove 56, in the vicinity of which the portion 22b of the connecting line that leads to the second work chamber 8 discharges into the stepped bore portion 46 having the smaller diameter.

The piston guide portion 53 protrudes from the face end of the stepped bore portion 46 of the holder part 30 and there has an armature plate 57 that cooperates with an electro-magnet 59 inserted on the face end into the holder part 30. To supply the electro-magnet 59 with current, the electro-magnet is connected to slip rings 60, 61, which are seated on a slip ring holder 62 inserted into the stub 38. The slip ring holder closes off the magnetic valve 51 from the outside, but can also have a relief bore 63, which communicates via a longitudinal bore 64 in the valve closing element 50 with the chamber in the stepped bore portion 45 receiving the restoring spring 52. This portion of the stepped bore is closed off by a plate 66 from the recess 33, which bore is filled with pressure fluid. Communication between the recess 33 and each of the connecting line portions 22a and 22b is effected by a one-way valve 65, only one of which is shown, that opens toward the work chamber.

As an alternative to the embodiment of FIG. 3, a variant is shown in FIG. 4 in which instead of the spiral spring 42 for prestressing the drive element relative to the holder part, a compression spring 67 is provided, which is disposed in a recess, beginning at the inner jacket face 39 of the drive element 15, and is fastened in between the lateral limitations of the recess and the pin joined to the holder element 30. The drive element can now be rotated relative to the holder element 30 or to the camshaft 6 along the length, in the circumferential direction of the recess 68. This embodiment is even more space-saving than that of FIG. 3.

The exemplary embodiment of FIG. 3 functions in the same manner as does that the principle of which is shown in FIG. 1. With the magnet valve 51 embodied with the valve closing element 50, the work chambers 7 and 8 can communicate with one another, and when one work chamber is acted upon by pressure, a relative adjustment is initiated by means of the camshaft torque, as long as the control valve 24 is opened. Via the check valves 65, the work chambers are filled with pressure fluid and decoupled with respect to the pressure fluid source, so that a locking of the relative position can be attained by closure of the control valve 24.

FIG. 5 in a second exemplary embodiment, shows a modified control valve, the apparatus otherwise being the same as in the first embodiment. The control valve here is embodied as an electromagnetic valve 70, in the form of a slide valve having a slide 71 that is displaceable inside an axial bore 72 of the holder element 30. The slide has an annular groove 73, which in its end position communicates with the mouth of the connecting line 22a, and the portion of the slide pointing toward the face end of the holder part 30 closes off the mouth of the connecting line 22b into the axial bore 72. In this position, the slide 71 is prestressed by a restoring spring 74. In the direction of the face end of the holder part 30, an actuating bolt 75 of the slide 71 protrudes to the outside, and there carries an armature plate 76, which is now located opposite an electromagnet 77 and is adjustable by it counter to the force of the restoring spring such that the slide brings the mouth of the connecting line 22b into communication with the annular groove 73, which continues to communicate with the connecting line 22a. The electromagnet 77 is disposed in a manner fixed against relative rotation in a cap part 78 through which the power supply 79 of the electromagnet 77 is extended to the outside.

In a supplement to the embodiment of FIG. 3, the location of angle encoders to ascertain the rotational position or rotational angle position of the drive element 15 relative to the camshaft 6 is also shown by way of example here. For this purpose, the end flange 29 has a spur gear 80 on one end, and is inserted into the housing 83 opposite a stationary part 81 of a first angle encoder 82. As a second angle encoder 83, a set of teeth 85 can be provided on the face end of the drive element, and the stationary part 86 is disposed opposite these teeth in the cap 78. Both angle encoders are connected to the control device 25, which in turn triggers the electromagnet 77 via the power supply 79. These times at which a communication between the work chambers is possible, because of a buildup of pressures in the work chambers, can be determined with the aid of the first angle encoder 82 as well.

A third exemplary embodiment is shown in FIG. 6 as a modification of the embodiments of FIGS. 3 and 5. Here one circular segment shell has been reduced to a feather key 88, which is inserted radially into the holder part 130. On the opposite end of the feather key 88, this key rests on the inner jacket face 39 of the drive element 15, thus dividing the work chambers 7 and 8 immediately adjoining the lateral/ends of the key from one another. The other circular segment shell 89, which is pinned firmly to the drive element 15 and thus is equivalent to the second circular segment shell 36 of FIG. 3, spans virtually over the entire circumference of the holder part 130, except for the work chambers 7 and 8. Both work chambers can be made to communicate with a transverse bore 91 in the feather key 88, and this transverse bore communicates in a manner not shown in further detail here with the pressure fluid source, via a radial bore 92 and a pressure fluid line 93 leading onward in the holder part 130. At the outlet of the transverse bore 91 into each of the work chambers, a respective spring tongue check valve 96 and 97 are provided on the face end 94 and 95 of the work chambers, which performs the function of the check valves 19 and 21 of FIG. 1. Once again not shown here, there is a direct communication between the work chambers via a control valve. This embodiment is especially space-saving and simple to achieve, and it produces a very small oil volume within the actuation circuit and thus results in increased drive rigidity.

Figure 7:
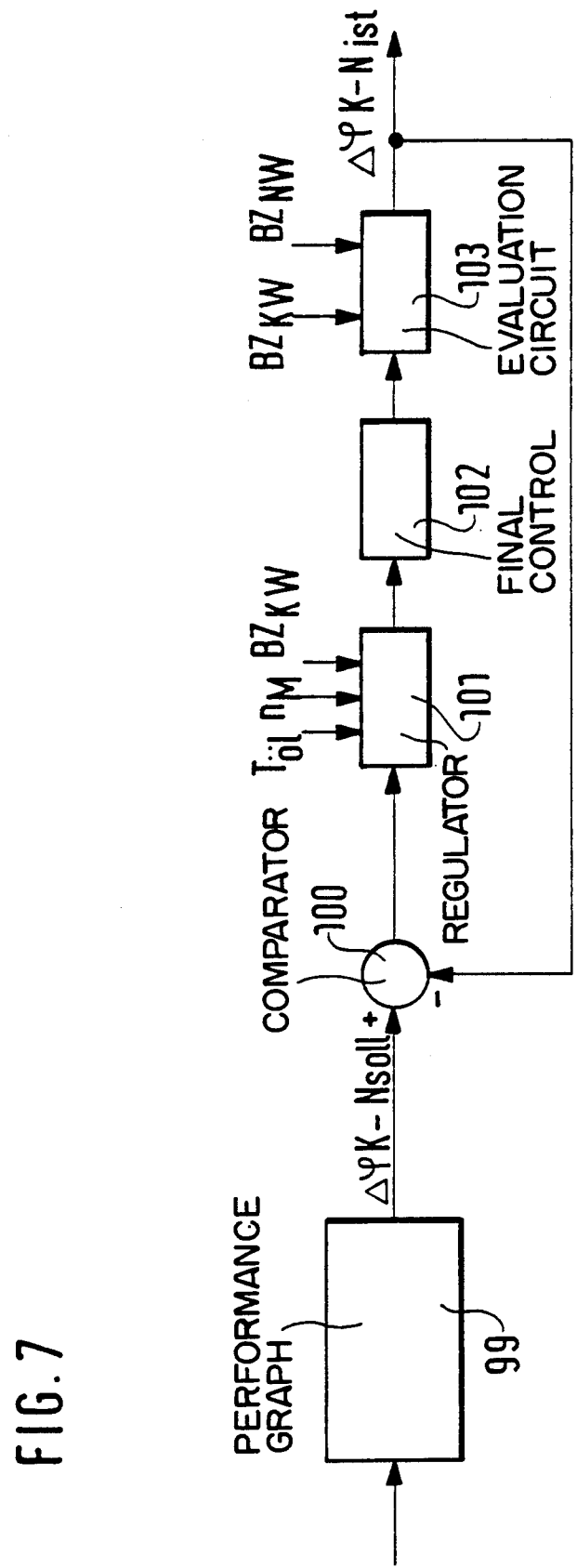
FIG. 7 is a control diagram for triggering the control valve.

In FIG. 7, the closed-loop control circuit that controls the phase relationship between the camshaft and the drive element is shown. This control circuit has a performance graph 99, in which the phase displacement between the drive element and the camshaft, $\Delta phi_k$ — $N_{soll}$ is stored in memory as a function of rpm. Depending on the rpm or other possible parameters, the set-point value of the phase displacement is then obtained, which is then compared with the actual phase position in a comparator 100. A regulator 101 is controlled as a function of the result of comparison and, taking into account the oil temperature $T_{\delta 1}$, the engine rpm $n_M$, and the location of a reference mark $BZ_{KW}$, which provides information on the operative drive phase position of the camshaft, triggers a final control element 102, which in the exemplary embodiments is the control valve 24 or the magnet valve 51, 70. The outcome of control by the final control element is ascertained with the aid of an evaluation circuit 103, which takes into account the control values of the first angle encoder 82 and second angle encoder 83, and is fed back to the comparator 100 as a feedback value. In this way, a desired phase relationship of the camshaft to the drive element can be furnished quickly and without major expense, and thus a control of the gas exchange valve opening time needed for desired results can be obtained. Such apparatuses can also be used to control other devices driven by camshafts, such as injection pumps. In that case, the instant of injection of the various injection events can be controlled in this way.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for adjusting a rotational angular relationship of a camshaft (6), serving in particular to actuate gas exchange valves of an internal combustion engine, to its drive element (15), having two control motors (1, 2) actuated by a control pressure medium with said control motors located opposite one another in an adjusting direction for rotation of the camshaft relative to the drive element, each control motor having two first walls (10, 11), movable relative to one another in the adjusting direction, and second walls (12, 13) which are each coupled to one another in such a way that upon adjustment in the adjusting direction, the first or second walls are adjusted in the same direction, and in this process the volume enclosed in a work chamber, defined by one first and one second wall each, increases whenever the volume in the other work chamber decreases, and these first and second work chambers (7, 8) defined by the first and second walls can be made to communicate via a valve with a control pressure fluid source, characterized in that the volumes enclosed in the work chambers (7, 8) upon an adjustment are increased and decreased by equal amounts, and the work chambers are made to communicate with the control pressure fluid source via a respective check valve (19, 21) which opens toward the work chamber, and can be made to communicate with one another directly via a control valve (24) controlled by a control device (25).

2. An apparatus as defined by claim 1, which includes a prestressing spring (16) disposed between said camshaft (6) and said drive element (15) which has the first movable walls (10, 11) and the second movable walls (12, 13).

3. An apparatus as defined by claim 1, in which said work chambers (7, 8) are located diametrically opposite one another in a common plane radial to the camshaft axis (5).

4. An apparatus as defined by claim 2, in which said work chambers (7, 8) are located diametrically opposite one another in a common plane radial to the camshaft axis (5).

5. An apparatus as defined by claim 1, in which the control valve (24) is opened by the control device (25) selectively at a time of low to minimum, or high to maximum, camshaft torques in the course of camshaft torque fluctuations.

6. An apparatus as defined by claim 2, in which the control valve (24) is opened by the control device (25) selectively at a time of low to minimum, or high to maximum, camshaft torques in the course of camshaft torque fluctuations.

7. An apparatus as defined by claim 3, in which the control valve (24) is opened by the control device (25) selectively at a time of low to minimum, or high to maximum, camshaft torques in the course of camshaft torque fluctuations.

8. An apparatus as defined by claim 5, in which said control device (25) communicates with a set-point value indicator and with an angle encoder (82) on the camshaft (6) and an angle encoder (84) on the drive element (15), and via a closed control loop controls the camshaft rotational angle position relative to the drive element rotational angle position as a function of operating parameters, by means of a selective triggering of the control valve 24.

9. An apparatus as defined by claim 1, in which said first movable walls (10, 11) are formed by end faces of a first circular segment shell (35), which is disposed resting tightly against a portion of a circumference of a portion of the camshaft, or of a holder part (30) connected to that portion of the camshaft in the circumferential direction, and the second movable walls (12, 13) are likewise the end faces of a second circular segment shell (36, 89), which is disposed opposite the first circular segment shell (35, 88), resting tightly on a portion of the circumference of a portion of the camshaft or of the holder part (30, 130) connected to it, and is connected firmly to a drive element (15) covering the first and second circular segment shells (35, 36; 88, 89) and the intervening work chambers (7, 8) on the portion of the outer circumference itself.

10. An apparatus as defined by claim 9, in which said work chambers (7, 8) are closed off by closure elements (34, 37) axially bounding the circular segment shells (35, 36; 88, 89) on both sides, and each can be made to communicate by means of a bore (22a, 22b; 91, 92) in the portion of the camshaft or the holder part (30) connected to it and via a check valve (65; 96, 97) with the control pressure fluid source, and can be made to communicate with one another via the control valve (51, 70, 24).

11. An apparatus as defined by claim 10, in which said control valve is embodied as an electromagnetic valve (51, 70), the valve closing element (50, 71) of which is disposed in an axial bore (45, 46; 72) in the portion of the camshaft or the holder part (30) connected to the camshaft.

12. An apparatus as defined by claim 9, in which said first circular segment shell is embodied as a feather key (88) and has a bore (92, 93) leading to the camshaft and communicating there with a pressure fluid line (28) originating at the control pressure fluid source, from which bore (92, 93) a transverse bore (91) extends, which discharges at the face end of each of the work chambers (7, 8) and at the discharge point is provided with one spring tongue valve (96, 97) each serving as a check valve.

13. An apparatus as defined by claim 10, in which said first circular segment shell is embodied as a feather key (88) and has a bore (92, 93) leading to the camshaft and communicating there with a pressure fluid line (28) originating at the control pressure fluid source, from which bore (92, 93) a transverse bore (91) extends, which discharges at the face end of each of the work chambers (7, 8) and at the discharge point is provided with one spring tongue valve (96, 97) each serving as a check valve.

14. An apparatus as defined by claim 11, in which said first circular segment shell is embodied as a feather key (88) and has a bore (92, 93) leading to the camshaft and communicating there with a pressure fluid line (28) originating at the control pressure fluid source, from which bore (92, 93) a transverse bore (91) extends, which discharges at the face end of each of the work chambers (7, 8) and at the discharge point is provided with one spring tongue valve (96, 97) each serving as a check valve.

15. An apparatus as defined by claim 9, which includes a torsion spring with each end of the torsion spring (42) connected as a prestressing spring to the drive element (15) and the portion of the camshaft, or the holder part (30) connected to the camshaft.

16. An apparatus as defined by claim 10, which includes a torsion spring with each end of the torsion spring (42) connected as a prestressing spring to the drive element (15) and the portion of the camshaft, or the holder part (30) connected to the camshaft.

17. An apparatus as defined by claim 11, which includes a torsion spring with each end of the torsion spring (42) connected as a prestressing spring to the drive element (15) and the portion of the camshaft, or the holder part (30) connected to the camshaft.

18. An apparatus as defined by claim 15, in which said torsion spring is disposed in the form of a spiral spring is disposed in an annular recess (41) formed by the drive element (15) and the portion of the camshaft or the holder part connected to said camshaft and one of the closure elements (37).

19. An apparatus as defined by claim 1, in which said drive element (15) includes a gear wheel (40) driven by a drive means.

20. An apparatus as defined by claim 11, in which said holder part connected to the camshaft can be screwed to an end flange (29) of the camshaft (6), said holder part includes an axial through bore (45, 46; 72), in which the closing element (50, 71) is guided, and said holder part includes a face end that encloses a recess (33) with the end flange (29) of the camshaft (6), a pressure fluid line (28) emerges axially from the camshaft, communicates with the control pressure fluid source and discharges into said recess, and said recess communicates with the bores (22a, 22b) leading to the work chambers, via check valves (65) inserted at a face end into the holder part (30).

21. An apparatus as defined by claim 12, in which said holder part connected to the camshaft can be screwed to an end flange (29) of the camshaft (6), said holder part includes an axial through bore (45, 46; 72), in which the closing element (50, 71) is guided, and said holder part includes a face end that encloses a recess (33) with the end flange (29) of the camshaft (6), a pressure fluid line (28) emerges axially from the camshaft, communicates with the control pressure fluid source and discharges into said recess, and said recess communicates with the bores (22a, 22b) leading to the work chambers, via check valves (65) inserted at a face end into the holder part (30).

22. An apparatus as defined by claim 13, in which said holder part connected to the camshaft can be screwed to an end flange (29) of the camshaft (6), said holder part includes an axial through bore (45, 46; 72), in which the closing element (50, 71) is guided, and said holder part includes a face end that encloses a recess (33) with the end flange (29) of the camshaft (6), a pressure fluid line (28) emerges axially from the camshaft, communicates with the control pressure fluid source and discharges into said recess, and said recess communicates with the bores (22a, 22b) leading to the work chambers, via check valves (65) inserted at a face end into the holder part (30).

23. An apparatus as defined by claim 20, in which said closing element of the magnetic valve is a slide (71) that is retained in a closing position by a spring (74) when the electromagnet (77) of the electromagnetic valve (70) is without current, and the electromagnet (77) is disposed in a cap part (78) of the apparatus opposite an armature (76) that at a face end protrudes out of the portion of the camshaft or the holder part (30) connected to said camshaft, the armature being connected to the slide (71).

24. An apparatus as defined by claim 20, in which said closing element (50) of the electromagnetic valve (51) is a seat valve closing element, with guide shafts adjoining a sealing face (54) that cooperates with a valve seat (48), the guide shafts being tightly guided in through bore embodied as a stepped bore (45, 46), and one of said shafts (53) is embodied as an armature, wherein the electromagnet (59) of the electromagnetic valve (51) is secured on the face end to the portion of the camshaft or the holder part (30) connected to said camshaft and has slip rings (60, 61) for supplying power to the electromagnet.

* * * * *